Figure 1:
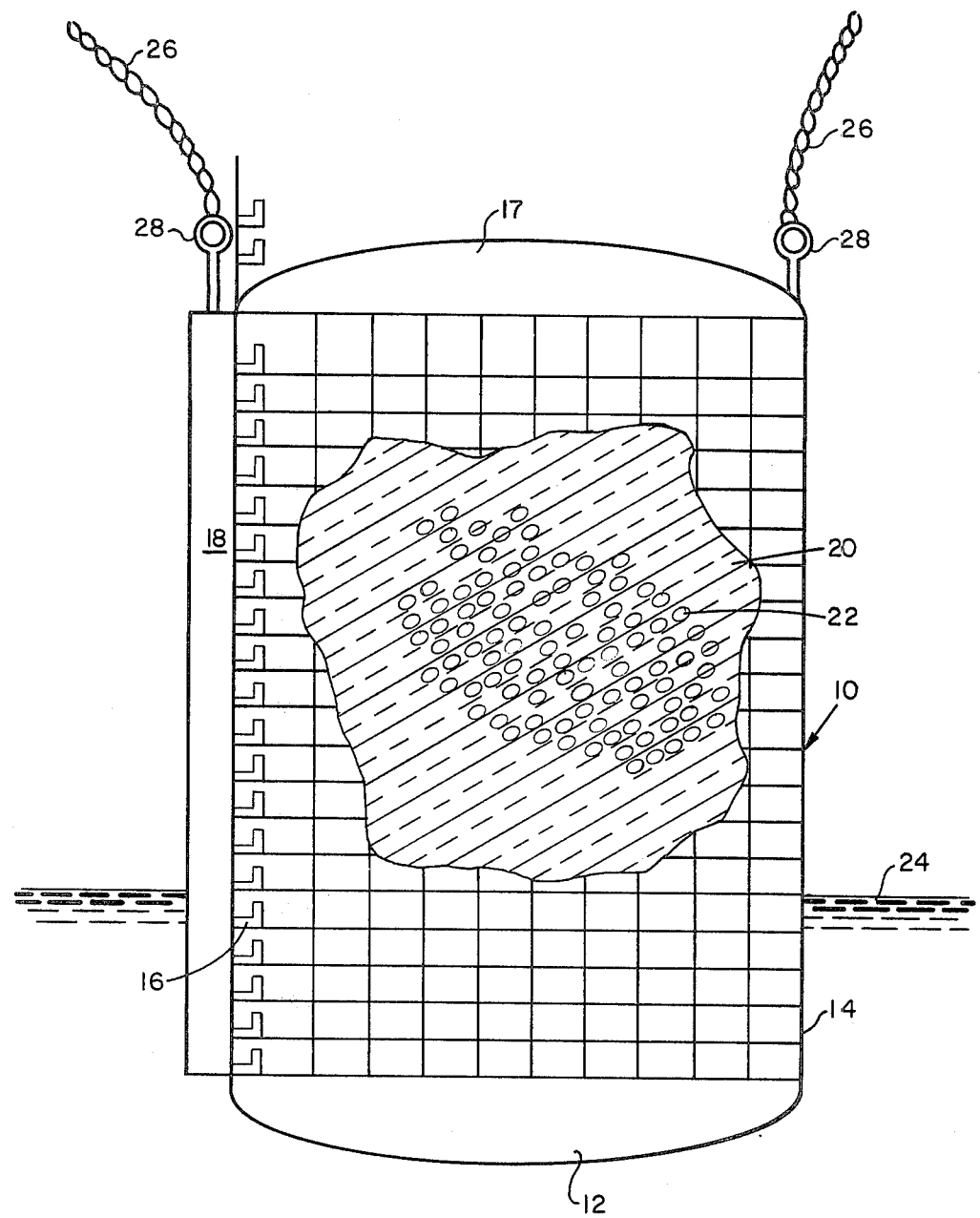

United States Patent [19]

Pocius et al.

[11] 4,420,463

[45] Dec. 13, 1983

[54] DRY CHEMICAL FEED SYSTEM

[75] Inventors: Frances C. Pocius, Lombard; William T. Buchanan, Oak Brook, both of Ill.

[73] Assignee: Nalco Chemical Company, Oak Brook, Ill.

[21] Appl. No.: 350,508

[22] Filed: Feb. 22, 1982

[51] Int. Cl.³ .......................................... B01D 11/02
[52] U.S. Cl. .................................... 422/266; 134/93; 261/DIG. 11; 261/DIG. 46; 422/277
[58] Field of Search ............... 422/261, 263, 264, 265, 422/266, 277; 134/93; 261/DIG. 11, DIG. 46, 121 R, 122, DIG. 72; 426/477; 210/206, 242.1; 222/163, 180

[56] References Cited

U.S. PATENT DOCUMENTS

| | | | |
|---|---|---|---|
| 1,874,091 | 8/1932 | Fahrney | 210/206 X |
| 2,072,976 | 3/1937 | Andrus | 422/266 H |
| 2,329,429 | 9/1943 | Weaver | 422/277 X |
| 3,120,491 | 2/1964 | Kincaid | 210/242.1 |
| 3,332,871 | 7/1967 | Robinson | 261/DIG. 46 |
| 3,476,520 | 11/1969 | Hovey | 426/477 X |
| 3,846,078 | 11/1974 | Brett | 422/265 X |
| 3,853,481 | 12/1974 | Murray | 422/264 B X |
| 4,005,010 | 1/1977 | Lunt | 261/DIG. 72 |
| 4,217,331 | 8/1980 | Schaub | 422/265 |

*Primary Examiner*—Richard L. Chiesa
*Attorney, Agent, or Firm*—John G. Premo; Robert A. Miller; Donald G. Epple

[57] ABSTRACT

An apparatus for feeding slowly soluble water-soluble chemicals into the basin of a cooling tower which contains water. The device comprises a rigid mesh cylindrical drum having a bottom, sides, and an open top. It has at least one vertically positioned, spaced-apart fastening member positioned along the inside of the drum. Inside the drum is a plastic mesh bag, adapted to receive solid, slowly soluble water-soluble chemicals. This bag is affixed to a fastening member. Also, there are means positioned at the top of the plastic mesh cylindrical drum for suspending it below the water level of the basin of a cooling tower.

4 Claims, 1 Drawing Figure

DRY CHEMICAL FEED SYSTEM

INTRODUCTION

Water used in industrial cooling devices such as cooling towers can cause many problems when it contacts metal surfaces. Scale, corrosion, biological growths, and the like typify problems associated with these waters. It is customary to treat these waters with chemicals to prevent scale, corrosion, and microbiological growth. To a lesser extent, other chemicals are used as dispersants, cleaning agents, and the like.

Oftentimes, the chemicals used to treat industrial cooling waters to solve the above listed problems are dry. Dry chemicals are difficult to feed when used to treat industrial cooling waters. Oftentimes, these tower locations do not have elaborate weighing or proportioning devices that allow the feed of the dry chemicals to be made with any degree of accuracy. Also, dry chemicals in the form of powders can present a health hazard to untrained operators coming in contact with them.

One solution to the problem of feeding dry chemicals to cooling tower waters is to form the dry chemicals into solid, compact masses so that the physical form becomes that of a briquette a ball, a cylinder, or other geometric shape. This provision of the chemical as a larger solid compressed mass affords several advantages. It makes handling a simpler matter and less hazardous. Simple feeders can be used to proportion the chemicals to the system and dosage can be regulated by counting out a particular number of shapes to be used in a system over a given period of time.

In using solid shapes of the type described above, feeding equipment is still required. Oftentimes this equipment is expensive and must be installed in the system, thus requiring the use of pipe fitters, electricians and other service workers which add to the cost of such feeders.

If it were possible to provide a simple feeder for dry chemicals of the type mentioned above, which feeders would be adapted to treat the basins of cooling towers, a major advance would be made in the art.

THE DRAWING

The drawing is a vertical view of the invention showing the feeding device and porous container used to contain the solid chemicals to be dissolved.

SPECIFIC DESCRIPTION OF THE INVENTION

With particular reference to the drawing, there is shown the open mesh feeding device of the invention 10 having a bottom 12, sides 14, and an open top 16. The open mesh cylinder may be constructed of any non-toxic, non-corrosive material. Preferred is plastic such as polyvinyl chloride, polypropylene, or polyethylene although a non-corrosive metal such as stainless steel may be used.

Within the feeder 10 are a series of one or more vertically positioned, spaced-apart horizontal hook members 16 which are supported by a vertical post 18 which is affixed to the sides of the feeder 10.

The hooks 16 are adapted to receive a plastic mesh bag 20. Contained within the bag are the dry chemicals which, in the drawing, are illustrated as being in the form of large pills or puck-shaped members 22.

In operation, the plastic bag 20 is fitted to one or more of the hooks 16 to adjust its relationship within the cylinder and the water level of a cooling tower basin designated by the numeral 24.

The feeder can be lowered or raised into the cooling tower basin by means of ropes 26 which are fastened to eyelets 28 fitted at about the top 17 of the feeder. The ropes would be tied to the grill work often found over the top of the cooling tower basin not covered by the tower.

The mesh bag 20 containing the chemical discs would be shipped in an outer container such as a paper or plastic bag or fiber drum. It would be removed from the shipping container and placed on the appropriate hook within the feeder and then lowered to the appropriate water level in the basin of the tower. The lower the bag is positioned on the hooks, the faster the dissolution rate.

It is thus evident that there is provided an improved method for inexpensively feeding dry chemicals to industrial cooling waters.

The dimensions of the various parts may be varied depending upon particular circumstances and environment under which the invention is used. For treating a typical industrial cooling tower, the feeder 10 could be constructed of a plastic mesh which would have an opening size of about $\frac{1}{2}$ inch of larger. The mesh bag used to contain the dry chemical would have smaller openings and would be similar to the type bag used to ship citrus fruits and vegetables. The openings of the mesh bag can be varied depending upon the size of the dry chemical particles sought to be fed.

Having thus described my invention, it is claimed as follows:

1. An apparatus for feeding slowly soluble water-souble chemicals into the basin of a cooling tower which contains water which comprises a rigid mesh cyindrical drum having a bottom, sides, and an open top, vertically, spaced-apart hooks positioned along the inside of the drum, a plastic mesh bag which contains solid, slowly soluble water-soluble chemicals affixed to one or more of said hooks, and means positioned at the top of the rigid mesh cylindrical drum for suspending it below the water level of the basin of a cooling tower.

2. The apparatus of claim 1 where the rigid mesh cylindrical drum is formed of a non-toxic, non-corrosive material.

3. The apparatus of claim 2 where the non-toxic, non-corrosive material is a plastic from the group consisting of polypropylene, polyvinyl chloride, and polyethylene.

4. The apparatus of claim 2 where the non-toxic, non-corrosive material is stainless steel.

* * * * *